United States Patent [19]

Hamano

[11] Patent Number: 4,901,118
[45] Date of Patent: Feb. 13, 1990

[54] COPYING APPARATUS WITH RECIRCULAR AUTOMATIC DOCUMENT FEEDER

[75] Inventor: Hiroaki Hamano, Osaka, Japan

[73] Assignee: Minolta Camera Kabushiki Kaisha, Osaka, Japan

[21] Appl. No.: 209,833

[22] Filed: Jun. 22, 1988

[30] Foreign Application Priority Data

Jun. 24, 1987 [JP] Japan ................................. 62-157025

[51] Int. Cl.$^4$ ............................................. G03G 21/00
[52] U.S. Cl. ........................................ 355/310; 271/7
[58] Field of Search ...................... 355/308, 309, 310; 271/3, 7, 227

[56] References Cited

U.S. PATENT DOCUMENTS

| 3,468,605 | 9/1969 | Martin | 355/310 X |
| 3,677,635 | 7/1972 | Van Auken et al. | 355/310 X |
| 3,770,348 | 11/1973 | Martin | 355/102 |
| 3,797,931 | 3/1974 | Miciukiewicz et al. | 355/310 |
| 4,445,682 | 5/1984 | Uchida | 271/301 |
| 4,465,271 | 8/1984 | Saitoh et al. | 271/227 |

Primary Examiner—Fred L. Braun
Attorney, Agent, or Firm—Burns, Doane, Swecker & Mathis

[57] ABSTRACT

A copying apparatus in which a document inserted into a document feed-in device is circulated through a recirculating path of a recircular automatic document feeder for multi-copying, and a copying paper is fed by cutting a roll paper on the basis of a first document detecting signal of a first detector disposed at the document feed-in device when copying a first sheet, and on the basis of the document length stored in a memory device and a second document detecting signal of a second detector disposed at the recirculating path when copying a second sheet onward, thereby the roll paper can be cut corresponding to the document length at multi-copying without enlarging the recircular automatic document feeder.

3 Claims, 9 Drawing Sheets

COPYING APPARATUS WITH RECIRCULAR AUTOMATIC DOCUMENT FEEDER

BACKGROUND OF THE INVENTION

1. Field of the Invention

This invention relates to a copying apparatus including a recircular automatic document feeder and a roll paper feeder, more particularly, it relates to a copying machine in which a cut timing of the roll paper at multi-copying has been improved.

2. Description of the Prior Art

Conventionally, various recircular automatic document feeders which recirculate document fed from a document feed-in device in a recirculating path for exposure have been provided. When combining such a type of recircular automatic document feeder and a copying machine designed to use a roll paper as the copying paper and to transfer an image on the roll paper suitably cut by a cutting means, it is difficult to set timing to cut the roll paper corresponding to the document length.

That is, when cutting the roll paper corresponding to the length of document, the cut timing must be known fairly before the rear end of the document passes an exposing position, in particular, such a trend is more distinct in the case of reduced copying. Therefore, when copying a first sheet, the cut timing may be set by detecting the rear end of the document with a sensor provided at the document feed-in device. However, when copying a second sheet onward, the document does not pass the document feed-in device but passes the recirculating path, so that the cut timing can not be set by the sensor. Though it is possible to set the cut timing by one sensor if the document is detoured to the feed-in device when copying the second sheet onward, it is not practical since the conveying unit becomes larger and the copying speed is deteriorated.

SUMMARY OF THE INVENTION

The present invention is devised to solve problems of the prior art aforementioned, therefore, it is an object of the present invention to provide a copying apparatus in which first and second document detectors are provided separately at a document feed-in device and in a recirculating path, and a memory means for storing the document length is disposed, whereby a roll paper is cut corresponding to the length of document at multi-copying without enlarging a recircular automatic document feeder by cutting it on the basis of document detecting signal of the first detector when copying a first sheet, and on the basis of document detecting signal of the second detector and the document length stored when copying a second sheet onward.

The above and further objects and features of the present invention will more fully be apparent from the following detailed description with accompanying drawings.

DESCRIPTION OF THE PREFERRED EMBODIMENTS

Now, one embodiment of a copying apparatus according to the present invention will be described with reference to the accompanying drawings.

Figure 1:
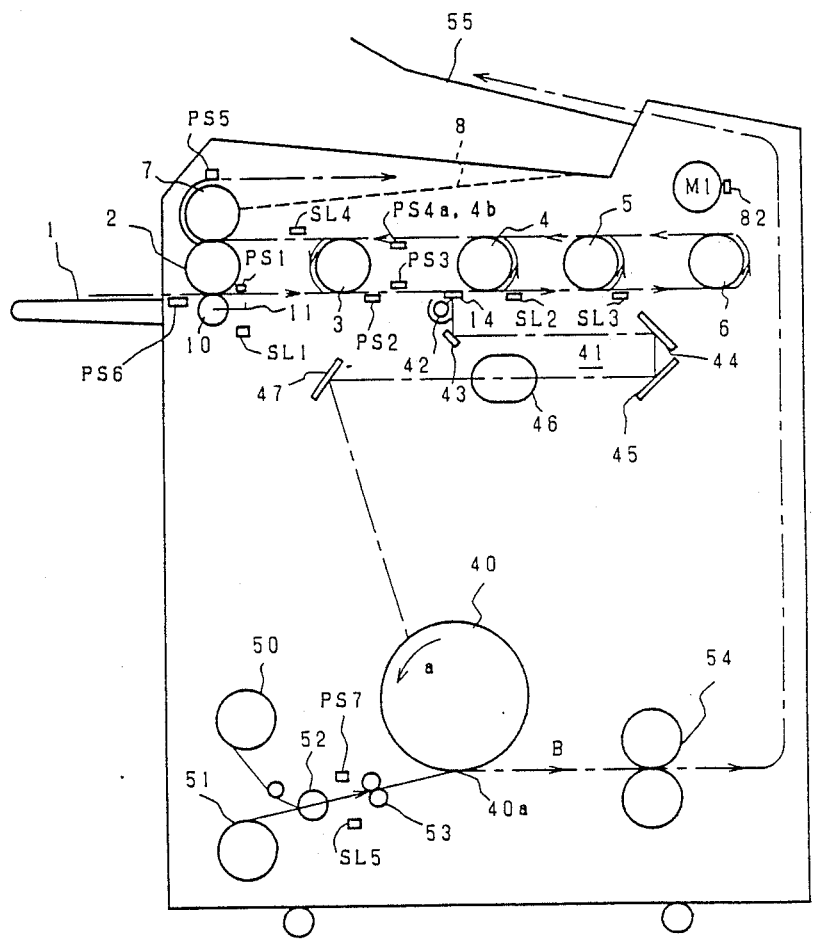
FIG. 1 is a schematic sectional side view showing the configuration of a copying apparatus according to the present invention.
Figure 2:
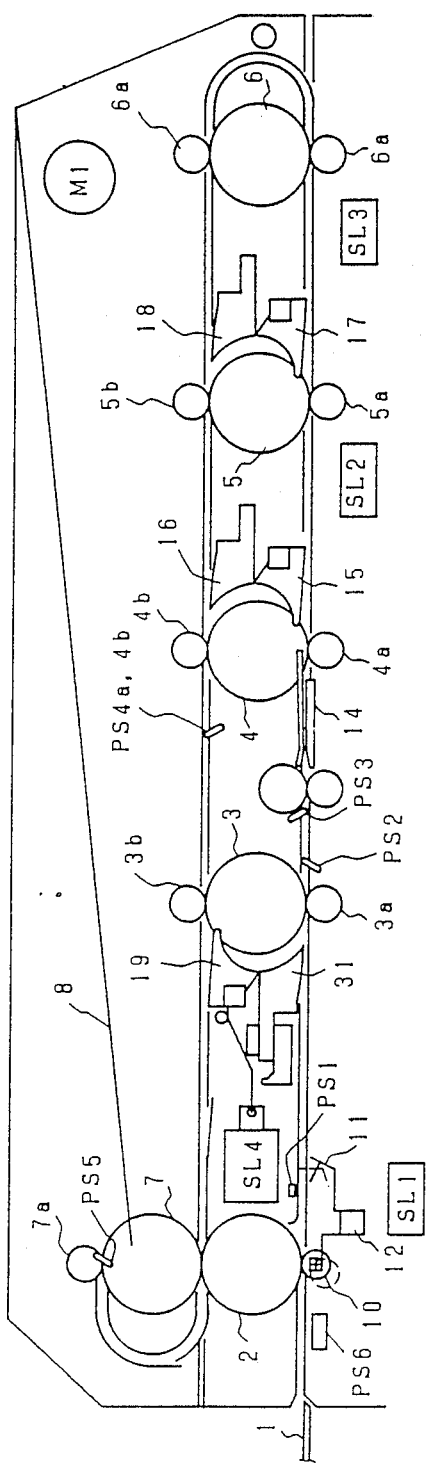
FIG. 2 is an enlarged sectional view of a recircular automatic document feeder.

FIG. 1 is a schematic sectional side view showing the configuration of a copying machine according to the present invention, and FIG. 2 is an enlarged sectional view of a recircular automatic automatic document feeder.

In the embodiment, as shown in FIG. 1, the recircular automatic document feeder, hereinafter referred to as RADF, is incorporated in the upper portion of the copying machine. The RADF is roughly constituted of a document inserting guide plate (1), document feed rollers (2) to (7) and document discharge tray (8).

Under the document feed roller (2), a document feed roller (10) is disposed so as to be into and out of contact with the roller (2) and a stopper (11) is disposed integrally therewith pivotally about a support axis (12). The document feed roller (10) and stopper (11) are driven by a solenoid (SL1) and, as shown by a dotted line in FIG. 2, usually the former is detached from the feed roller (2) and the latter is penetrated into the document feed path shown by a single dot chain line (A). Meanwhile, when the solenoid (SL1) is energized, the feed roller (10) is contacted to the feed roller (2) and the stopper (11) is retreated from the document feed path to prepare for feeding the document.

The feed roller (2) is rotatably driven in the counter-clockwise direction by a feed motor (M1). Identically, the feed rollers (3) to (6) and (7) are rotatable counter-clockwise and clockwise by a feed motor (M1), and being provided with driven rollers (3a), (3b), (4a), (4b), (5a), (5b), (6a), (6b) and (7a) respectively. The feed rollers (4), (5) include switching claws (15), (17) and guide plates (16), (18) for switching the recirculating path, and the feed roller (3) includes a switching claw (19) for switching the circulation and discharge of the document, and a correcting guide plate (31) for correcting oblique movement of the document.

The switching claws (15), (17), (19) are movable back and forth during the document feeding by solenoids (SL2), (SL3), (SL4) respectively.

Concretely, when the switching claw (15) is penetrated into the feed path in the state where the switching claw (19) is penetrated, the document is recirculated between the feed rollers (3), (4), and when the switching claw (17) is penetrated in place of the claw (15), it is recirculated between the feed rollers (3), (5), and between the feed rollers (3), (6) when the switching claws (15), (17) are retreated. Conversely, when the switching claw (19) is retreated from the feed path, the document is discharged on the discharge tray (8) from the feed roller (7).

At the document feed-in device, photo sensors (PS6), (PS1) for detecting the document are disposed, and in the document feed path, photo sensors (PS2), (PS3), (PS4a), (PS4b), (PS5) are disposed for detecting the document. Each sensor detects the front and rear ends of the document at that position so that the output of each sensor is to be used as reference signals for detecting the operation timing of a cutter (52), the document length and the paper being blocked.

Next, the configuration of the copying machine will be explained roughly.

A photosensitive drum (40) is rotatable in the direction indicated by an arrow (a) and well-known image forming elements such as a charger, developer etc. (not shown) are arranged around its periphery. An optical system (41) is constituted of an exposure lamp (42), mirrors (43), (44), (45), lens (46) and mirror (47) to project light on the document conveyed on a glass (14) disposed between the feed rollers (3), (4), the reflected light is slit exposed on the photosensitive drum (40).

Two types of rolled copying papers (50), (51) are set, either one of which is fed selectively and conveyed to a transferring portion (40a) through the cutter (52) driven by a solenoid (SL5) and a pair of timing rollers (53). A copying paper transferred with an image at the transferring portion (40a) is conveyed as shown by a single-dot line (B) in FIG. 1 and discharged on an upper discharge tray (55) after fixing a toner image at a fixing unit (54). Immediately before the pair of timing rollers (53), a copying paper detecting sensor (PS7) is provided.

Figure 3:
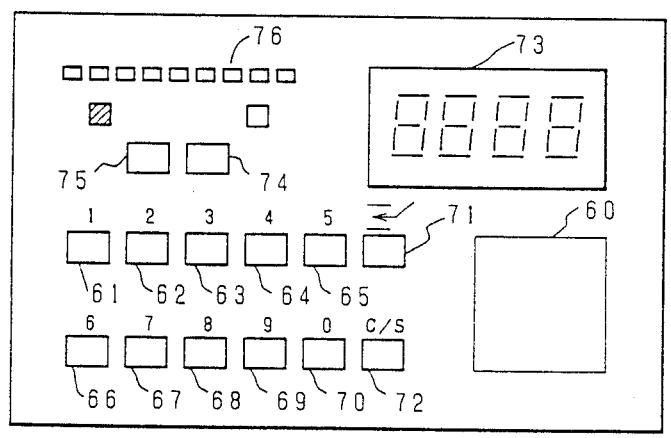
FIG. 3 is a plan view of an operating panel.

FIG. 3 shows an operation panel, wherein (60) is an copy starting key, (61) to (70) are ten keys for setting the number of sheets to be copied, (71) is an interruption key, (72) is a clear/stop key, and (73) is a display for displaying the number of sheets to be copied. (74), (75) are up/down keys for selecting the image density of copies and (76) are a group of LED displays for indicating the selected density.

Figure 4:
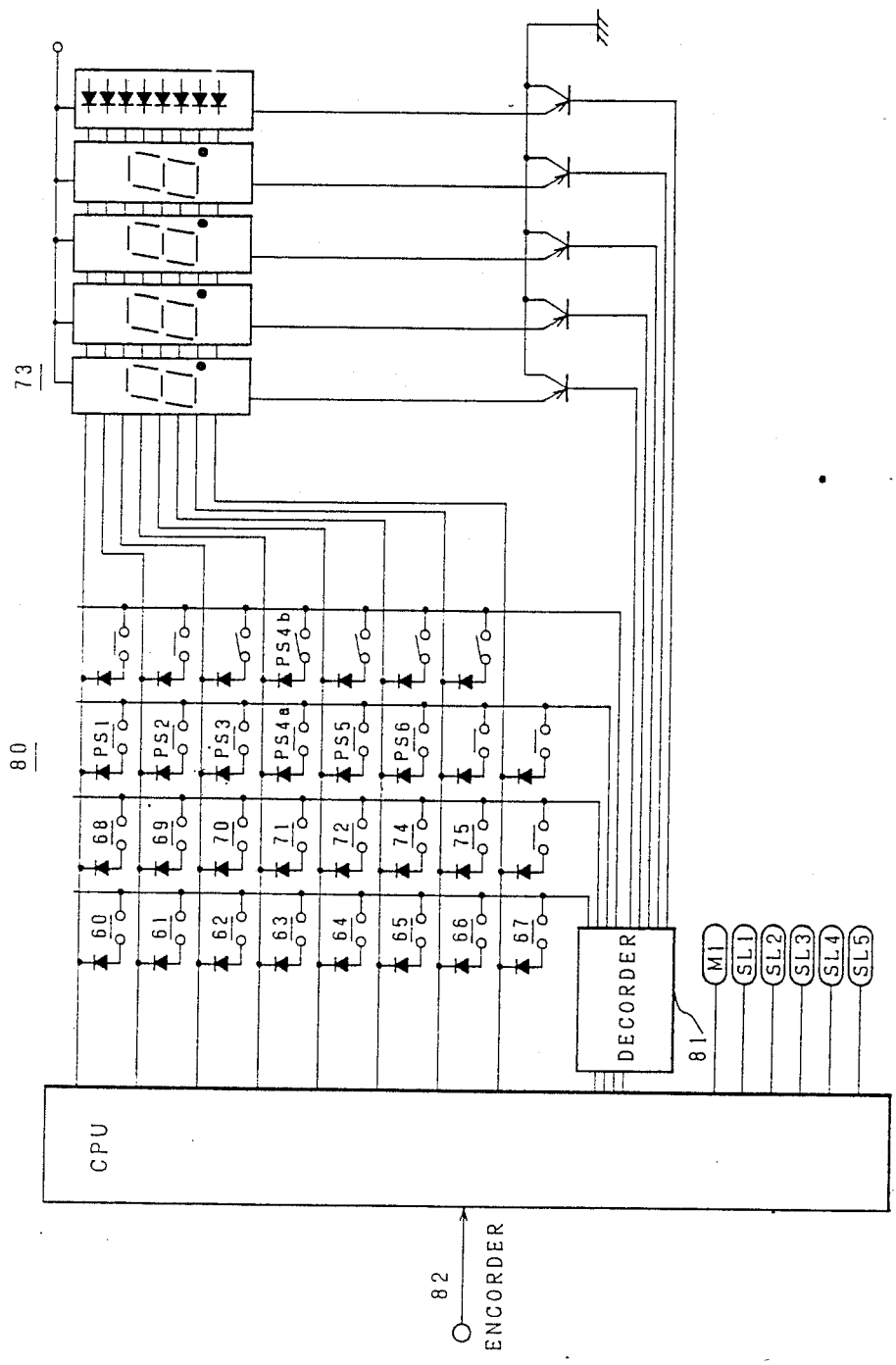
FIG. 4 is a block diagram of a control circuit.

FIG. 4 shows a control circuit, in which, to a microcomputer (CPU) for controlling operations of the RADF as well as the copying machine itself, a switch, matrix (80) is connected, and the display (73) is connected to the (CPU) through the matrix (80) and a decoder (81). To output terminals of the (CPU), the feed motor (M1), solenoids (SL1) to (SL5) and so on are connected. To input terminals of the (CPU), an encoder (82) of the feed motor (M1), photosensors and so on are connected.

Now, the operations of the RADF thus constructed, as well as the copying machine itself will be explained roughly.

The copying machine starts the copying operation when the sensor (PS1) detects a document inserted from the guide plate (1).

That is, when the document is inserted along the guide plate (1) and its front end is detected by the sensor (PS1), the solenoid (SL1) is put on, contacting the feed roller (10) to the feed roller (2) and retreating the stopper (11) from the feed path to convey the document in the direction indicated by an arrow. Simultaneously, either of the rolled copying papers (50), (51) selected in advance is fed, but when its front end is detected by the sensor (PS7), feeding is stopped termporarily.

The document fed into the glass (14) receives light irradiated from the optical system (41), and a document image is formed on the periphery of the photosensitive drum (40) as an electrostatic latent image, which is developed into a toner image by a developer (not shown). When a prescribed time has elapsed since the front end of the document was detected by the sensor (PS3), the pair of timing rollers (53) are driven and the copying paper is conveyed to the transferring portion (40a) in synchronism with the toner image, and the roll paper is cut by the cutter (52) operated at timing corresponding to the document length as to be described in the following in detail.

Next, operation of the RADF, particularly, in relation to the cut timing of the roll paper will be explained with reference to flow charts of FIG. 5 and the rest.

Figure 5:
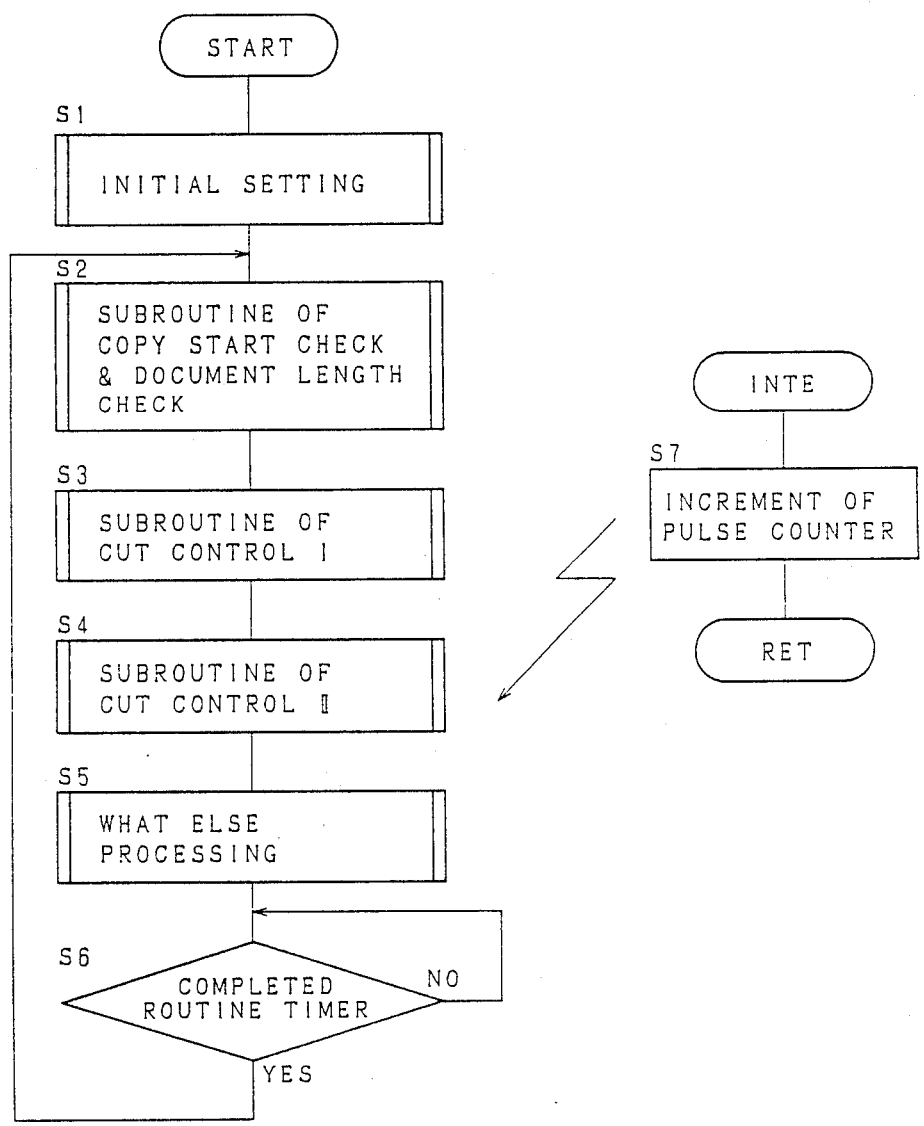
FIGS. 5, 6(a), 6(b), 7 and 8 are flow charts showing controlling procedures.

FIG. 5 shows a main routine of the microcomputer (CPU).

When the (CPU) is reset and the program is started, in Step (S1), an initial setting for clearing a random access memory (RAM) and bring initiatives of various registers and devices are set to the initial modes. Next, in Steps (S2) to (S5), respective subroutines are called sequentially and when processings of all subroutines are finished, processing returns to Step (S2) after waiting the completion of routine timer in Step (S6). The routine timer decides the required time of the mainroutine, whose value is fixedly set and is used as the reference of timers used in each subroutine.

When an interrupt request is made by the (CPU), in Step (S7), a pulse counter is incremented. This is effected by the signal from the encoder (82) of the feed motor (M1), and by this pulse counter value, a conveyed distance or position of the document is detected.

Figure 6A:
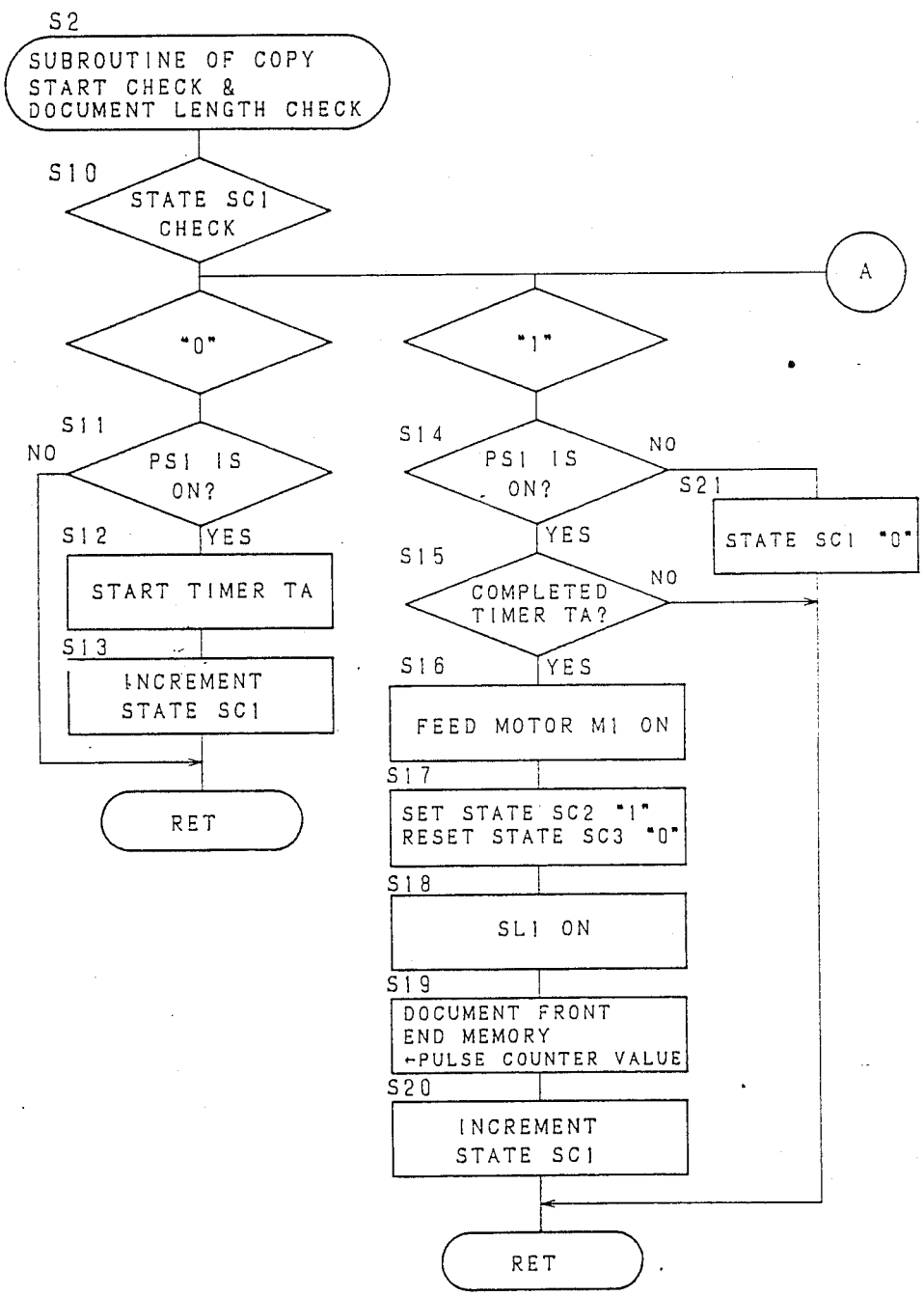
Figure 6B:
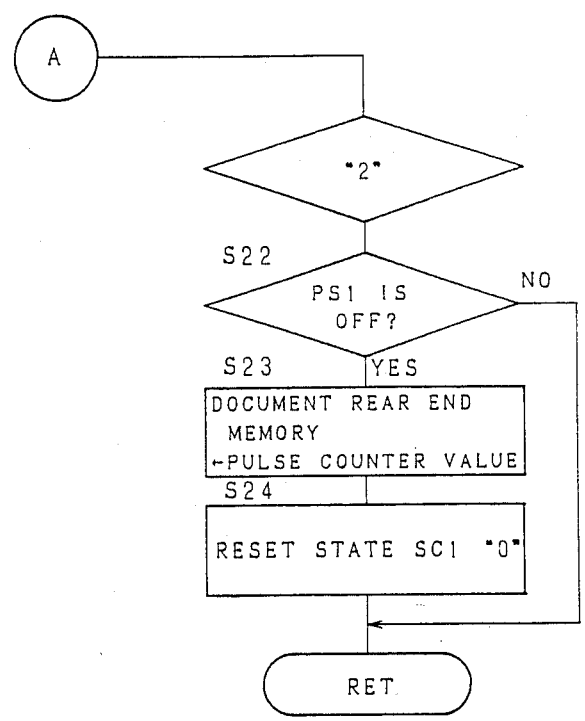

FIGS. 6(a), 6(b) show a subroutine of copy start check and document length check executed in Step (S2) in the main routine. The subroutine checks the starting state of copying operation to start it when the condition is prepared and processing for detecting and storing the document length.

First, in Step (S10), a state counter (SC1) for start check is checked to execute the following steps on the basis of its count value.

When the state counter (SC1) is "0", in Step (S11), it is determined whether or not the sensor (PS1) is ON. If ON, that is, the front end of the document is detected by the sensor (PS1), in Step (S12), a timer (TA) of 0.5 sec. is set, the state counter (SC1) is incremented in Step (S13) and processing returns to the main routine.

When the state counter (SC1) is incremented and set at "1" in Step (S13), in Step (S14), it is determined whether the sensor (PS1) is ON. If ON, after the completion of timer (TA) in Step (S15), the feed motor (M1) is put ON in Step (S16), and in Step (S17) a state counter (SC2) for cutting the roll paper at copying the first sheet is set at "1", and a state counter (SC3) for cutting the roll paper at copying the second sheet onward is rest at "0". Next, in Step (S18), the solenoid (SL1) is put ON to retreat the stopper (11) from the feed path and to cause the roller (10) in contact with the roller (2) so as to start conveying the document.

Now, for detecting the document length in Step (S19), the pulse counter value from the encoder (82) is sampled in a document front end memory. Then, in Step (S20), the state counter (SC1) is incremented and processing returns to the main routine. When the sensor (PS1) is not ON, it is determined NO in Step (14) and the state counter (SC1) is reset to "0" in Step (S21) and processing returns to the main routine.

When the state counter (SC1) is incremented and set to "2" in Step (S20), in Step (S22), it is determined whether the sensor (PS1) is put OFF, if OFF, that is, the rear end of the document passes the sensor (PS1), in Step (S23) the pulse counter value from the encoder (82) is sampled in a document rear end memory for detecting the document length. Then, in Step (S24), the state counter (SC1) is reset to "0" to complete the subroutine.

Figure 7:
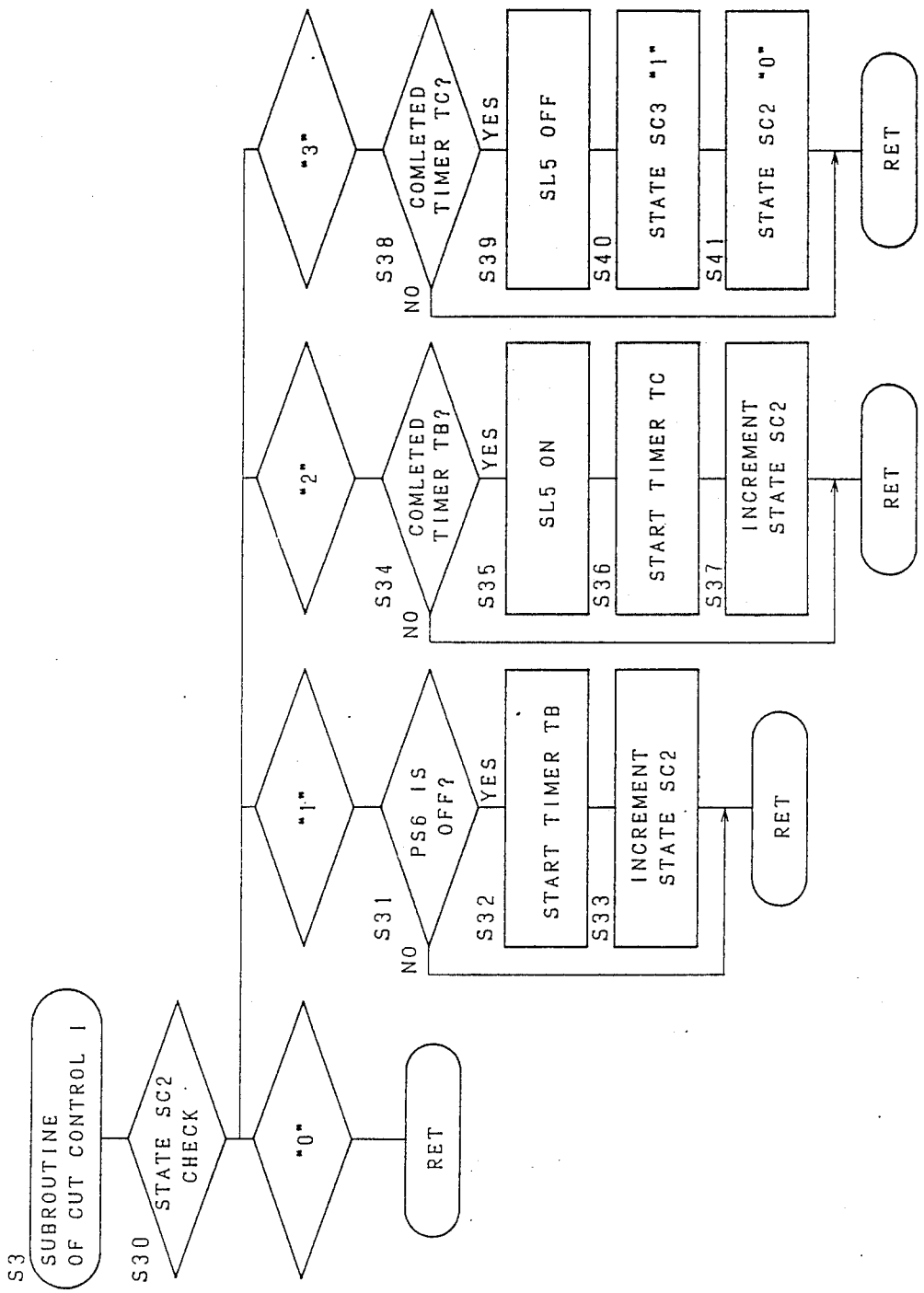

FIG. 7 shows a subroutine of roll paper cut control I at copying the first sheet executed in Step (S3) of main routine.

First, in Step (S30) a state counter (SC2) for the cut control I at copying the first sheet is checked to execute the following steps on the basis of its count value.

When the state counter (SC2) is "0", processing returns to the main routine without performing any processing.

When the state counter (SC2) is set to "1" in Step (S17), in Step (S31) it is determined whether the sensor (PS6) is just OFF. If OFF, a timer (TB) is started in a Step (S32) at timing when the rear end of the document passes the sensor (PS6), the state counter (SC2) being incremented in Step (S33) and processing returns to the main routine. The timer (TB) is for obtaining the timing to cut roll paper at copying the first sheet and set in advance at time (TB) represented by the following equation (1).

$$TB = \frac{Lps6\text{-}exp + Let - Lcut\text{-}t}{Vp} \quad (1)$$

where
- Lps6-exp: distance from the sensor (PS6) to the exposing position,
- Let: distance from the exposing position on the photosensitive drum to the transferring position,
- Lcut-t: distance from the cutting position to the transferring position,
- Vp: document feed speed.

When the state counter (SC2) is incremented and set to "2" in Step (S33), after the completion of the timer (TB) in Step (S34), the solenoid (SL5) is put ON in Step (S35). Thereby, the cutter (52) is operated to cut the roll paper corresponding to the document length. Next, in Step (S36), a timer (TC) is started, the state counter (SC2) is incremented in Step (S37) and, processing returns to the main routine. The timer (TC) is for deciding the ON time of the cutter solenoid (SL5) and set to 500 m sec. in advance.

When the state counter (SC2) is incremented and set to "3" in Step (S37), after the completion of the timer (TC) in Step (S38), the solenoid (SL5) is put OFF in Step (S39). Next, in Step (S40) the state counter (SC3) for a cut control II at copying the second sheet onward is set to "1". In addition, the state counter (SC2) used herein is reset to "0" in Step (S41) to complete the subroutine.

Figure 8:
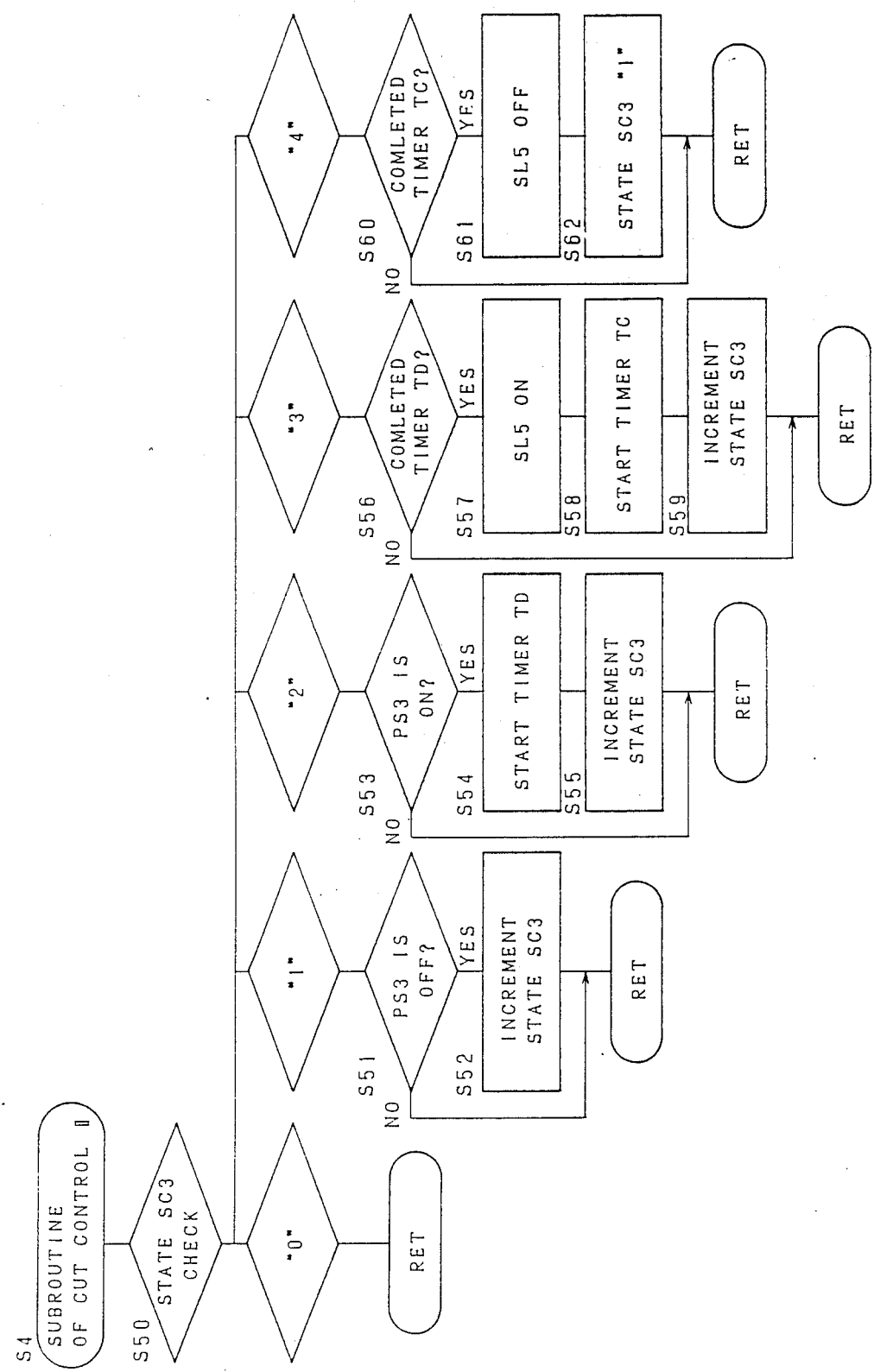

FIG. 8 shows a subroutine of the roll paper cut control II at copying the second sheet onward executed in Step (S4) in the main routine.

In the subroutine, at first in Step (S50), a state counter (SC3) is checked to execute the following steps on the basis of its counted value.

When the state counter (SC3) is "0", processing returns to the main routine without performing any processing.

When the state counter (SC3) is set to "1" in Step (S40), in Step (S51) it is determined whether the sensor (PS3) is OFF. If OFF, the state counter (SC3) being incremented in Step (S52) and processing returns to the main routine.

When the state counter (SC3) is incremented and set to "2" in Step (S52), in Step (S53) it is determined whether a sensor (PS3) is just ON. If ON (the timing when the front end of the circulated document passes the sensor (PS3)), a timer (TD) is started in Step (S54), the state counter (SC3) is incremented in Step (S55) and processing returns to the main routine. The timer (TD) is for obtaining the timing to cut the roll paper at copying the second sheet onward, and set in advance at the time represented by the following equation (2).

$$TD = \frac{Lps6\text{-}stop + (A - B) \times \text{pulse length}}{Vp} \quad (2)$$

where,
- Lps6-stop: distance from the sensor (PS6) to the stopper (11),
- A: document rear end memory value,
- B: document front end memory value.

When the state counter (SC3) is incremented and set to "3" in Step (S55), after the completion of the timer (TD) in Step (S56), the solenoid (SL5) is put ON in Step (S57). Thereby, the cutter (52) is ON to cut the roll paper corresponding to the document length. Next, in Step (S58) the timer (TC) is started, the state counter (SC3) is incremented in Step (S59) and processing returns to the main routine.

When the state counter (SC3) is incremented and set to "4" in Step (S59), after the completion of the timer (TC) in Step (S60), the solenoid (SL5) is put OFF in Step (S61) and the state counter (SC3) is set to "1" in Step (S62) to complete the subroutine.

It is to be understood that the copying apparatus according to the present invention is not limited to the foregoing embodiment and various modifications may be made without departing from the spirit and scope thereof.

In particular, the signal whereon the cut timing is based when copying the first sheet may be the signal from the sensor (PS1) and not from the sensor (PS6). Also, the signal whereon the cut timing is based when copying the second sheet onward may be the signal from the sensor (PS4a) or (PS4b) and not from the sensor (PS3). It is also possible to constitute as such that the cut timing of next copying is determined on the basis of the rear end detecting signal of the document from the sensor (PS3) at previous copying.

As it will be apparent from the aforesaid description, according to the present invention, since it has been designed to produce the roll paper cutting signal on the basis of the first detecting signal of a first document detecting means disposed at the document feed-in device when copying the first sheet, and to produce the roll paper cutting signal on the basis of the document length detected and stored in course of circulation at copying the first sheet, and the detecting signal of a second document detecting means disposed in the recirculating path when copying the second sheet onward, the roll paper can be cut corresponding to the document length at multi-copying without enlarging the RADF.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the meets and bounds of the claims, or equivalence of such meets and bounds thereof are therefore intended to be embraced by the claims.

What is claimed is:

1. A copying apparatus comprising,
   a document circularly conveying means including a document feed-in device to which a document is inserted, and a recirculating path through which said inserted document is circularly conveyed, to convey circularly said document in said recirculating path;
an image processing means for forming and copying the document image;
a paper feeding means for feeding a roll paper to said image processing means;
a cutting means for cutting said roll paper according to a prescribed cutting signal;
a first document detecting means disposed at said document feed-in device for detecting said document thereat to output a first document detecting signal;
a document length detecting means for detecting the inserted document length;
a document length memory means for storing said document length detected by said document length detecting means;
a second document detecting means disposed in said recirculating path for detecting said document thereat to output a second document detecting signal; and
a cutting control means outputting said cutting signal on the basis of said first document detecting signal of said first document detecting means when copying a first sheet, and outputting said cutting signal on the basis of said document length stored in said document length memory means, and said second document detecting signal of said second document detecting means when copying a second sheet onward.

2. A copying apparatus as set forth in claim 1, wherein said second document detecting means outputs said second document detecting signal when detecting the front end of said document.

3. A copying apparatus as set forth in claim 1, wherein said first document detecting means outputs said first document detecting signal when detecting the rear end of the document, said second document detecting means outputs said second document detecting signal when detecting the front end of the document, and said cutting control means outputs said cutting signal after a prescribed time from the time when said first document detecting signal of said first document detecting means is outputted, and after the time decided corresponding to said document length stored in said document length memory means from the time when said second document detecting signal of said second document detecting means is outputted.

* * * * *